Patented Sept. 8, 1942

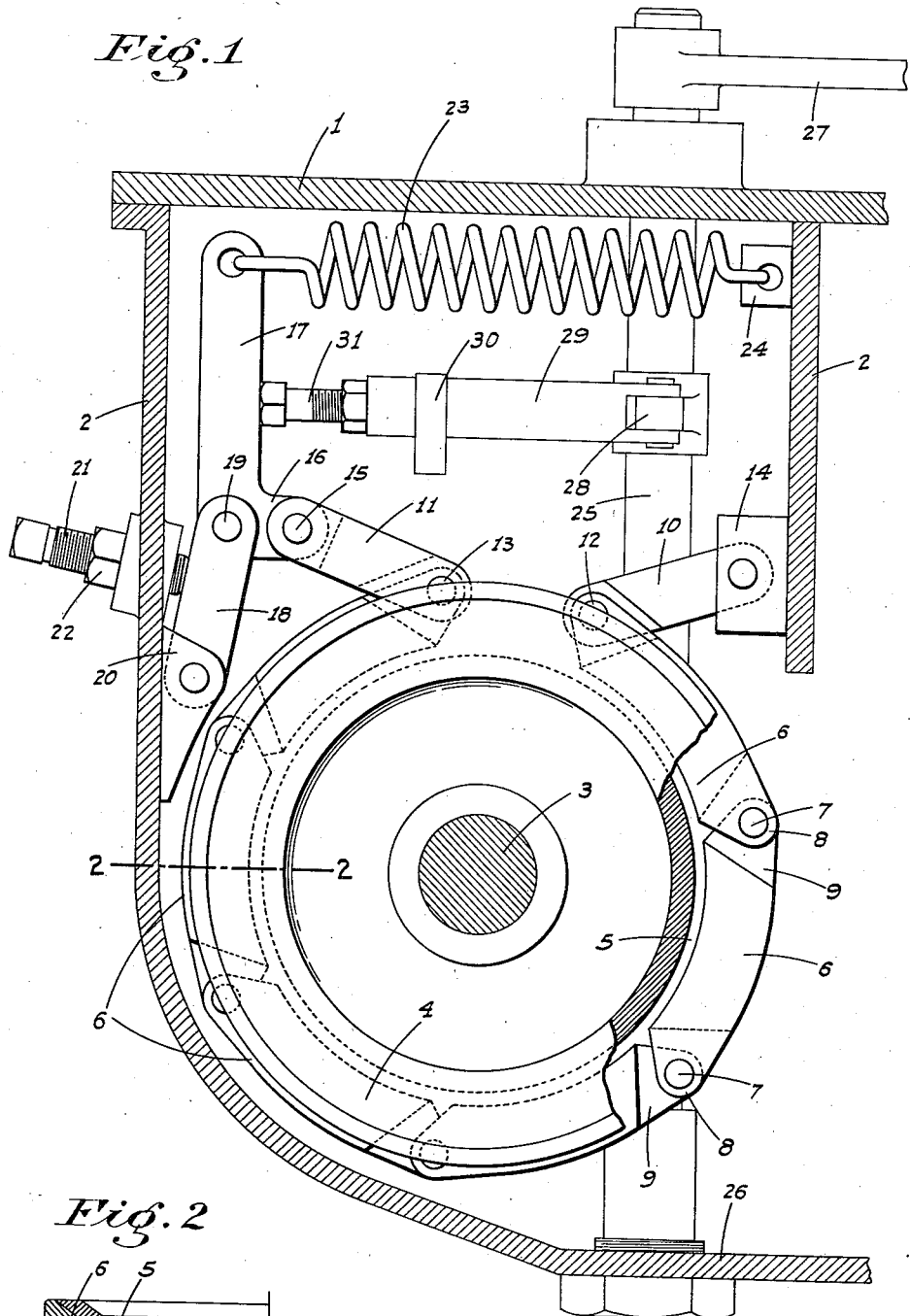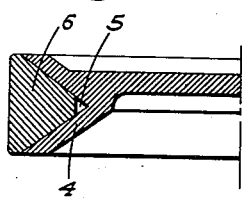

2,295,224

UNITED STATES PATENT OFFICE 2,295,224

BRAKE STRUCTURE

Robert G. Le Tourneau, Peoria, Ill., assignor to R. G. Le Tourneau, Inc., a corporation Application November 24, 1941, Serial No. 420,168

3 Claims. (Cl. 188—77)

This invention is directed in general to an improved brake structure, and in particular the invention relates to a unique form of brake drum and cooperating brake shoe unit, together with novel control mechanism therefor.

One of the objects of the invention is to provide a brake structure which is operative to exert a high braking leverage without the necessity of employing bulky and weighty mechanism.

Another object of the invention is to provide a brake control mechanism which includes a spring-urged bellcrank and a plurality of links arranged in novel assembly; said brake control mechanism being operative, with relatively slight movement of a manual control lever, to smoothly and gradually release the brake from a normal set or on position, and to automatically reset the brake when the lever is returned to its initial position.

A further object of the invention is to produce a simple and inexpensive brake structure, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is an end elevation partly in section of the improved brake structure.

Figure 2 is a fragmentary cross section on line 2—2 of Fig. 1.

Referring now more particularly to the characters of reference on the drawing, the brake structure is shown housed in a case which includes a head plate 1 and depending side walls 2, such side walls adjacent the head plate being parallel.

The shaft 3 to be braked extends horizontally through the case some distance below the head plate 1 and substantially centrally between the side walls 2. A brake drum 4, preferably of steel, is fixed on shaft 3, and the periphery of said brake drum is formed with an annular groove 5 of substantial depth and V-shaped in cross sectional configuration.

An articulated brake shoe unit cooperates with the brake drum and comprises a plurality of arcuate segmental brake shoes 6, which are relatively short and whose working portions are likewise V-shaped in cross section and engage in symmetrical relation in the V-groove 5; these shoes being preferably of cast bronze.

The shoes 6 of the articulated brake unit are pivoted together at adjacent ends, as indicated at 7, for limited swinging or pivotal movement relative to each other. The pivotal connection between the shoes includes spaced ears 8 projecting from the end of one shoe and fitting over an ear 9 on the other shoe, the pivot 7 extending through all of said ears.

The free ends of the articulated brake shoe unit terminate at the top of the brake drum and in slightly spaced relation. Links indicated at 10 and 11 are pivoted at 12 and 13 respectively to corresponding free ends of the brake shoe unit, and extend from said pivots at an upward slope and in diverging relation to each other in the plane of the drum. The link 10 is pivoted at its upper end between spaced ears 14 fixed on and projecting inwardly from the adjacent side wall 2 of the case. The upper end of link 11 is pivoted at 15 to the lower and substantially horizontal leg 16 of an upstanding bellcrank 17. This bellcrank 17 is supported by a link 18 pivoted at its upper end at 19 to the axis of the bellcrank and extending therefrom at a downward and outward slope to pivotal connection between spaced ears 20 mounted on and projecting inwardly from the corresponding side wall 2. An adjustable stop bolt 21 is threaded through this side wall and abuts the adjacent edge of depending link 18 intermediate the ends of the latter. The bolt 21 is normally held in locked position by a nut 22 and bolt 21 limits movement of link 18 away from the drum, thus serving to regulate brake shoe clearance.

The upstanding leg of the bellcrank is normally urged in a direction to effect downward swinging movement of the lower leg 16 by means of a tension spring 23 which connects between the upper end of said bellcrank and an attachment ear 24 on one wall of the case. It will be seen that under the tension of spring 23 the leg 16 is urged in a downward direction, and as link 11 slopes downwardly from said leg 16 to pivotal connection with the adjacent end of the brake unit, the latter is normally urged into braking engagement with the brake drum.

The mechanism employed to release the brake comprises an upstanding shaft 25 which extends from the bottom 26 of the case through the head plate 1 thereof; being fitted exteriorally of the case with a manually operated lever 27. Within the case and immediately below tension spring 23, the shaft 25 is provided with a radial finger 28. A brake release arm 29 is pivoted at one end in connection with the radial finger 28 and extends therefrom through a guide 30 in the direction of the upstanding leg of bellcrank 17 but terminating at its free end short thereof. This free end of the brake release arm 29 is provided with an adjustable engagement bolt 31 which is threaded into such free end of arm 29, the head of the bolt engaging the adjacent edge of the upstanding leg of the bellcrank intermediate the ends of the latter. With movement of lever 27 through a relatively small arc, this motion is imparted to arm 29, which in turn swings the upstanding leg of the bellcrank in a direction against the tension of spring 23, effecting a release of the brake shoe unit from the brake drum and permitting rotation of shaft 3. Upon release of lever 27 the spring 23 instantaneously resets the brake.

While this brake structure has been designed especially for use as the braking mechanism in a power control unit, such as shown in United States Letters Patent No. 1,912,645, and wherein the brake is normally held in set or on position by a spring under load, this invention obviously is not limited to such use and the structure may readily be adapted to many other types of equipment.

From the foregoing description it will be readily seen that I have produced such a brake structure as substantially fulfills the objects of the invention as set forth herein.

While this specification sets forth in detail the present and preferred construction of the brake structure, still in practice such deviations from such detail may be resorted to as do not form a departure from the spirit of the invention, as defined by the appended claims.

Having thus described my invention, what I claim as new and useful and desire to secure by Letters Patent is:

1. In a brake structure which includes a drum and a brake shoe unit engaging the drum, said unit having free ends spaced apart somewhat, a pair of links pivoted at their inner ends on said free ends of the unit and extending from the drum in the plane of rotation of the latter and in diverging relation to each other, means pivotally anchoring the outer end of one link, a pivotally supported bellcrank disposed adjacent the outer end of the other link and in substantially said plane, means pivoting the outer end of said other link on the outer end of one leg of the bellcrank, a spring connected with the other leg of the bellcrank and normally urging the same in a direction to effect brake-applying motion to said other link and said brake shoe unit, and manually actuated means to swing the bellcrank in the opposite direction.

2. A structure as in claim 1 in which the bellcrank is pivotally supported by means of a link; said link being pivoted at one end to the bellcrank at its axis and thence extending radially away from the bellcrank in diverging relation to the brake drum, and means pivotally anchoring the other end of said link.

3. A structure as in claim 1 in which the bellcrank is pivotally supported by means of a link; said link being pivoted at one end to the bellcrank at its axis and thence extending radially away from the bellcrank in diverging relation to the brake drum, and means pivotally anchoring the other end of said link, there being adjustable stop means engaging said link intermediate its ends, and limiting movement thereof in a direction away from the drum.

ROBERT G. LE TOURNEAU.